Oct. 13, 1970   J. PIANALTO   3,533,663
TRACTION ENHANCING MEANS
Filed Feb. 29, 1968

INVENTOR
Joseph Pianalto.
BY
HIS   ATTORNEYS

United States Patent Office 3,533,663
Patented Oct. 13, 1970

3,533,663
TRACTION ENHANCING MEANS
Joseph Pianalto, 4514 Liberty Ave.,
Pittsburgh, Pa. 15224
Filed Feb. 29, 1968, Ser. No. 709,246
Int. Cl. B62d 55/24
U.S. Cl. 305—35         5 Claims

ABSTRACT OF THE DISCLOSURE

There is disclosed a channeled belt for placement over a vehicle wheel or tire and over an idler pulley rotatably mounted on the vehicle and spaced from the wheel or tire. The idler pulley is placed in front of the wheel engaged by the channeled belt. It has been found that sandwiching the channeled belt between the wheel or tire and a road surface greatly enhances the traction characteristic of the wheel or tire.

---

The present invention relates to traction enhancing means and more particularly to such means mounted on a self-propelled vehicle, such as an automobile. The traction enhancing means of my invention are partially useful on icy pavements and other slippery road surfaces.

Previously, numerous attempts have been made to increase the traction of vehicular wheels, particularly the drive wheels of passenger automobiles, on slippery road surfaces. Many such efforts have been devoted to minimizing the hazards of winter driving conditions. The formerly widespread use of chains and the concomitant necessity of jacking up the rear or drive end of the vehicle to place the chains over the tires have been essentially supplanted by various types of "winter tread" tires. Many designs of "knobby" and equivalent winter treads have been proposed and utilized with differing degrees of success.

While all of these previously proposed traction enhancing devices have had more or less limited success, under snow and mud conditions, the increase in traction afforded by such devices on icy pavements has been virtually negligible. Accordingly, various types of abrasive materials have been admixed with tread rubber of winter tires in an attempt to increase the traction thereof on icy pavements. While abrasive treads have achieved limited success, their popularity has never been overwhelming because of considerably reduced tire life. Similarly, winter tires have been provided with tungsten or high carbon steel studs in a brute force attempt to increase the traction thereof on slippery pavements. Here again, despite limited successes the desirability of studded winter tires is diminished by the rapid wearing of the studs and the difficulty of initial installation in the tire tread.

A differing and more subtle approach to the problem has been afforded by the so-called "saw-dust" tires having a quantity of coarse saw-dust embedded in the tire tread. As the tire wears, particles of the saw-dust are dislodged from the tread surface leaving pockets in the rubber surfaces. The large number of such pockets act as suction cups to enhance the tractional engagement of the tire, particularly on icy pavements. Saw-dust tires however have never evidenced good wearability owing to displacement of considerable tire rubber by the saw-dust and the rapid wearing of the rubber adjacent the depressions caused by periodic dislodgement of saw-dust.

In the use of previously proposed traction enhancing devices, considerable bother and difficulty is experienced by the user in adding or removing the chains or winter tires. As noted above the use of chains is especially undesirable as they must be removed each time the vehicle is driven over dry pavement to prevent destruction of the chains. On the other hand the use of winter tread tires involves even more difficulties in placing and removing the tires, and in consequence the tires are usually left on the vehicle throughout the winter months. In most areas, owing to prompt snow removal, at least on the main traffic arteries of the country, the preponderant percentage of driving time is spent on dry pavements even during the winter months. All winter tires, therefore suffer from the common disadvantage of rapid tread wear on dry pavement, because the heavy tread design of winter tires reduces the dissipation of tread heat generated at highway speeds. Those winter tires equipped with studs or other abrasive means are subject to more accelerated wear on dry pavement.

In view of the foregoing it is evident that a considerable need has arisen for traction enhancing means which can be quickly and easily installed and removed from the automobile to avoid use of the traction enhancing means on dry pavements. I overcome the disadvantages of the prior art in this respect and provide improved traction enhancing means which are readily installed by a single individual without the use of tools and without removing wheels, replacing tires, or jacking up the rear end or drive end of the vehicle. My traction enhancing means moreover can be easily folded or coiled for ready transportation in the trunk of the automobile without undue space consumption. My traction enhancing means therefore, can be quickly and easily installed whenever slippery road surfaces are encountered and thereafter quickly and easily removed when dry driving conditions again prevail. The traction enhancing means of my invention completely eliminate the necessity of installing chains or winter treads upon vehicular wheels and require only limited modification of existing automobiles or similar self-propelled vehicles.

I accomplish these desirable results by providing traction enhancing means comprising an idler pulley rotatably mounted on a vehicle frame or chassis, and a flexible endless belt wrapped over said idler pulley and over a drive wheel of said vehicle, said pulley being generally aligned with said wheel.

I also desirably provide similar traction enhancing means wherein said belt is generally channel-shaped in cross section to aid in retaining said belt on said wheel and on said pulley.

I also desirably provide similar traction enhancing means wherein said pulley is mounted generally in front of said drive wheel.

I also desirably provide similar traction enhancing means wherein a lower run of said belt is inclined upwardly from the footprint area of said wheel to counterbalance the tendency of said wheel to sink in a soft road surface or the like.

I also desirably provide a traction enhanced vehicle comprising at least one drive wheel, an idler pulley rotatably mounted on said vehicle adjacent said drive wheel, and an endless flexible belt partially wrapped around said drive wheel and around said pulley.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings I have shown and described certain presently preferred embodiments of the invention and have illustrated certain presently preferred methods of practicing the same, wherein.

Figure 1:
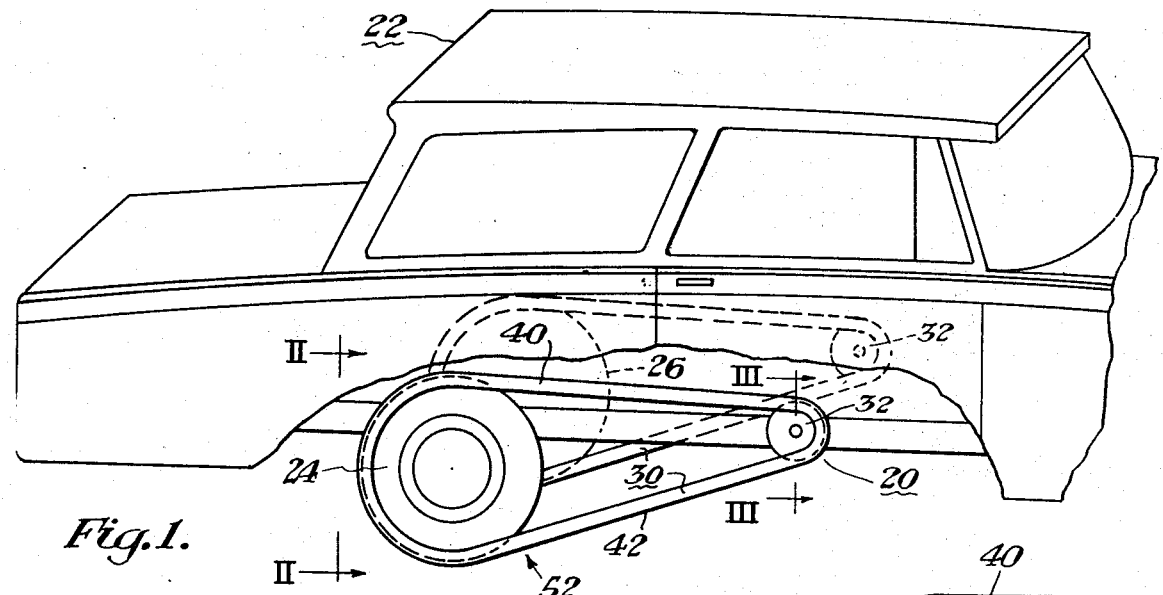
FIG. 1 is a partial, side elevational view of a vehicle such as a passenger car having my novel traction enhancing means installed thereon.

Referring now more particularly to the drawings and initially to FIG. 1 thereof, my novel traction enhancing means 20 is depicted in a typical installation on passenger automobile 22 for example. At least one drive wheel of the vehicle 22 and, in this example, both rear wheels 24, 26 are provided with my traction enhancing means 20. As my invention obviates the necessity of the drive wheels 24, 26 contacting icy or other slippery pavements, the drive wheels 24, 26 can be provided with a high speed or "summer" tread design 28, such as that denoted generally in the broken away portion of FIG. 2. However, with the use of my traction enhancing means which can be provided with a same or differing tread design, as discussed below, it is not necessary to substitute winter tread tires for the drive tires 24, 26 or to encase the tires in chains or the like.

In the instant arrangement of my invention, one or more of the traction enhancing means 20 can be installed upon a particular vehicle. For example, although two such traction enhancing means 20 are shown in FIG. 1 it will be understood that the single means 20 can be employed on those vehicles having, for example, an anti-spin or clutched differential.

Figure 3:
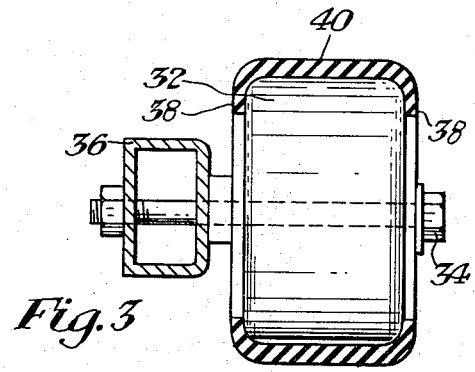
FIG. 3 is an enlarged partially sectioned view of the vehicle as shown in FIG. 1 and taken along reference line III—III thereof.
Figure 4:
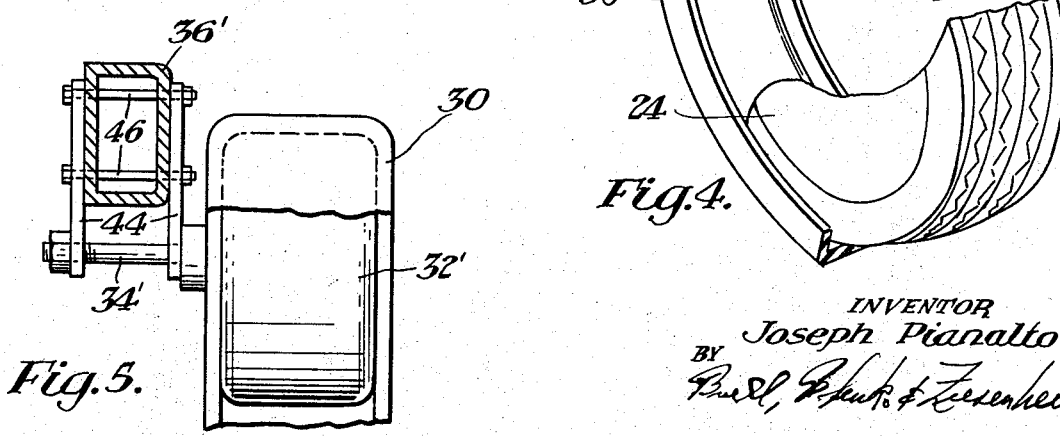
FIG. 4 is a partial perspective view of one of the drive wheels of the vehicle shown in FIG. 1 with my novel traction enhancing means installed thereon.

In the arrangement of FIG. 1, then, my novel traction enhancing means 20 include for each of the wheels 24, 26, an endless belt 30 having a channel-shaped cross section, as better shown in FIGS. 3 and 4 of the drawings. Each endless belt 30 is supported on the associated tire 24 or 26 and upon idler pulley 32 rotatably mounted on stub shaft 34, which in turn is secured to chassis frame or vehicle beam 36 as better shown in FIGS. 1 and 3 of the drawings. In this example the stub shaft passes directly and transversely through the longitudinal chassis beam 36, to which it is secured. The channel shape of the endless belt 30 forms relatively low sidewalls 38 on the belt 30 which serves to retain the belt 30 upon the tire 24 or 26 and the associated idler pulley 32.

The relatively low sidewalls 38 of the belt in addition facilitate mounting or wrapping the belt 30 partially around the associated tire 24 or 26 and around the idler pulley 32 therefor. Thus, a single individual can drape the belt 30 (owing to its shallowly channel configuration) partially over the associated tire and over the idler pulley 32 which desirably is disposed forwardly and upwardly of and in general alignment with the tire or wheel. Subsequent movement of the vehicle 22 causes the associated tire 24 or 26 to roll over and into the trough formed by the inner surfaces of the belt 30. The belt 30 thereupon assumes its proper position upon the outer circumferences of the tire 24 or 26 and associated idler 32. The trough shape of the endless belt 30 retains the belt upon the tire 24 or 26 and the associated idler pulley 32 during movement of the vehicle 32.

When dry road surfaces are again encountered, the endless belt 30 can readily be removed from the associated drive wheel 24 or 26 and the pulley 32 by a single individual without the use of tools and without jacking up the rear end of the vehicle 22. This can be done simply by pulling the upper run 40 outwardly and downwardly from the upper surfaces of the associated wheel 24 or 26. Removal of the belt 30 in this fashion is facilitated when the vehicle has been driven in the forward direction, as the upper run 40 of the belt 30 becomes less taut than its lower run 42. After the belt 30 has been pulled away in this manner from the upper and rear circumferential surfaces of the wheel 24 or 26, the belt can then be readily slipped off the idler pulley 32. Thereafter a limited forward movement of the vehicle 22 removes the belt 30 from beneath the wheel 24 or 26, whereupon the belt or belts 30 can be stored in the trunk of the vehicle 22.

Figure 5:
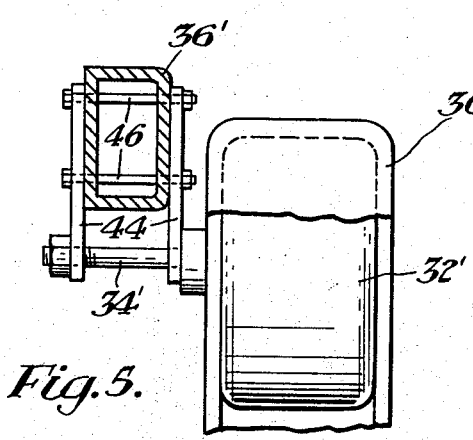
FIG. 5 is a cross sectional view similar to that of FIG. 3 and illustrating an alternative installation of my novel traction enhancing means.

Depending upon the specific structure and shape of the vehicle chassis on which the idler pulley 32 in installed, the pulley 32 can be mounted either in the manner shown in FIG. 3 of the drawings or alternatively as shown in FIG. 5. In the latter figure stub shaft 34' is secured to a pair of depending plates 44 which in turn are secured to the car frame 36', as by a plurality of through bolts 46. It will be understood of course that the idler pulley 32 is not subject to vehicle supporting or driving forces and need not be heavily constructed.

By the same token, it will be appreciated that the belt 30 is subject only to wheel loading in the footprint area of the tire 24 and 26. As the belt 30 is thereby loaded only at its circumferential surfaces and is not subjected to air pressure or other laterally directed forces, the belt 30 need not be reinforced with a multiple-ply cord structure or other reinforcement conventionally applied to automobile tires. Thus, the belt 30 can be fabricated entirely from tread rubber or other flexible material, with considerably less difficulty and labor than is involved in fabricating a conventional tire carcass. Moreover, without the need for any reinforcement means or casing in the belt 30, the belt is much more easily handled during installation on and removal from the vehicle 22.

The belt 30 of my novel traction enhancing means can be provided with any desirable tread design, as the belt 30 is not intended to be used on dry road surfaces. Moreover, I have found that use of the traction enhancing belt 30 offers considerable advantage although not provided with any particular form of tread but rather with a relatively smooth surface.

The reason for this marked improvement and unusual result is not immediately clear. According to my present understanding of the invention, however, it appears that the application of shearing forces to the material of the belt at the footprint areas of the drive wheel 24 or 26 causes bunching or other distortion in the material of the belt 30 resulting in a suction cup effect upon slippery road surfaces and particularly upon icy surfaces. Therefore, at least under certain driving conditions it is desirable to provide the outer surfaces of the traction belt 30 with a smooth surface, or with a lightly embedded tread surface 48 such as shown in FIG. 4 of the drawings. It will be understood, of course, that the tread surface 48, if used, need be only lightly embedded into the outer or circumferential surface of the belt 30 as the latter will not be used in dry surfaces and will not be subject to considerable wear.

Figure 2:
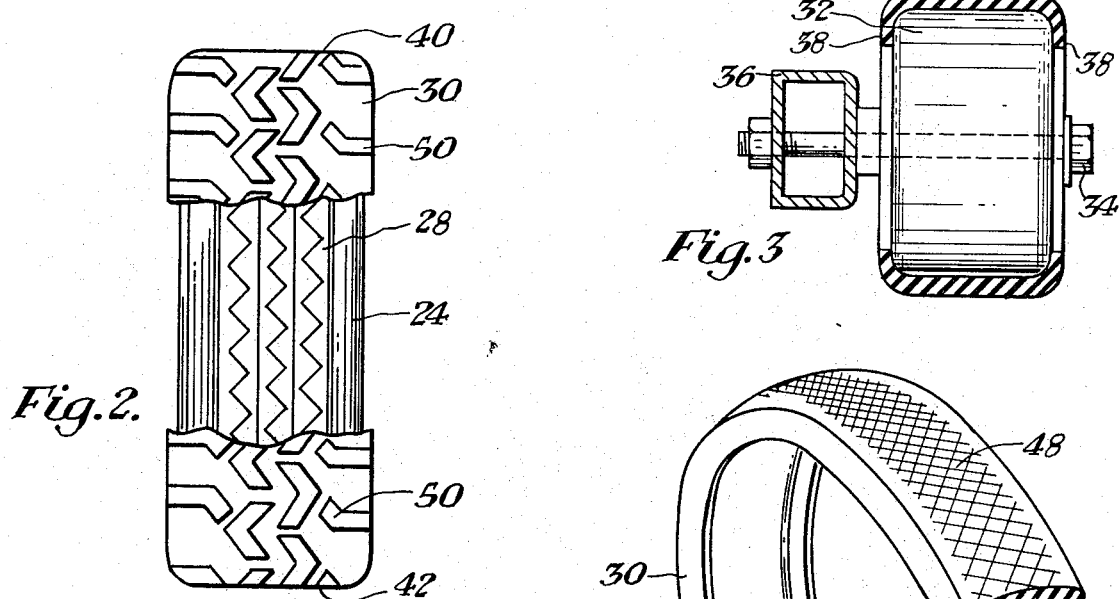
FIG. 2 is an enlarged partially sectioned view of the vehicle as shown in FIG. 1 and taken along reference line II—II thereof.

Alternatively, as shown exemplarily in FIG. 2 of the drawings, the traction belt 30 can be provided with a typical winter tread 50 on its outer surface to further increase its traction in mud or loose snow. However, my novel traction belt 30 is beneficial in mud or deep snow without any particular tread design as the taut condition in the lower run 42 of the belt, when the associated wheel 24 or 26 is moving, prevents loose material from building up in the area 52 generally in front of the wheel. The taut condition of the belt 30 also aids in minimizing sinking or pentration of the wheel into the mud or other loose material. In furtherance of this purpose, the lower run 42 of the belt is inclined upwardly, as seen in FIG. 1.

In addition to the particular tread designs 48, 50 illustrated in FIGS. 2-4 of the drawings, it is contemplated that the traction belt 30 can be provided with a typical summer or high speed tread design such as that denoted by the reference character 28 in FIG. 2 of the drawings.

In such case, as intimated above, the tread design need not be embedded to the depth conventionally provided in automobile tires owing to the brief periods of usage of the traction belt 30 under the usually slippery driving conditions.

From the foregoing it will be apparent that novel and efficient forms of traction enhancing means have been described herein. While I have shown and described certain presently preferred embodiments of the invention and have illustrated presently preferred methods of practicing the same, it is to be distinctly understood that the invention is not limited thereto, but may be variously embodied and practiced within the scope of the following claims.

I claim:

1. Traction enhancing means for a vehicle having at least one drive wheel and a pneumatic tire thereon, said means comprising an idler pulley rotatably mounted on a frame or chassis for said vehicle, said pulley being disposed forwardly of said tire and in alignment therewith and at an elevation such that a lower portion of said pulley is generally above the footprint of said tire and an upper portion of said pulley is substantially at the same elevation as the top portion of said tire, a shallowly channeled flexible endless belt wrapped over said idler pulley and over said tire, an upper run of said belt being substantially horizontal and a lower run of said belt being inclined upwardly in front of said tire footprint to prevent said drive wheel and said tire from sinking into relatively soft supporting surfaces and to minimize the interposition of debris in front of that inclined portion of said belt immediately in front of said tire footprint, said belt being maintained generally in alignment with said wheel and said idler pulley by its channeled configuration, said belt being fabricated from cordless tread rubber or similarly flexible elastomeric material to conform to the juxtaposed surfaces of said pulley and of said tire and being thereby capable of manual installation, said pulley being rotatably secured to a stub shaft passed through a longitudinal beam forming part of said chassis.

2. The combination according to claim 1 wherein said vehicle is provided with a pair of said drive wheels each having a pneumatic tire thereon, an idler pulley is so located for each of said drive wheels respectively, and a traction belt is wrapped about each of said drive wheels and its associated idler pulley.

3. The combination according to claim 1 wherein said belt is provided with a lightly embedded tread on its circumferential surface.

4. The combination according to claim 3 wherein said tire and said belt are each provided with a high speed tread, the tread of said belt being lightly embedded relative to the normally heavily embedded tread of said tire.

5. The combination according to claim 3 wherein said belt is provided with a lightly embedded winter or low speed tread and said tire is provided with a normally heavily embedded summer or high speed tread.

References Cited

UNITED STATES PATENTS

| | | | |
|---|---|---|---|
| 1,276,319 | 8/1918 | Borst | 305—31 |
| 3,219,133 | 11/1965 | Clowers. | |
| Re. 14,200 | 10/1916 | Hobson. | |
| 1,217,442 | 2/1917 | Gunther. | |
| 2,644,539 | 7/1953 | Gazda | 305—35 X |

FOREIGN PATENTS 36,972    12/1926    Denmark.

RICHARD J. JOHNSON, Primary Examiner